March 19, 1940.   J. B. ROGERSON   2,194,269
OIL PURIFICATION PROCESS
Filed March 21, 1938
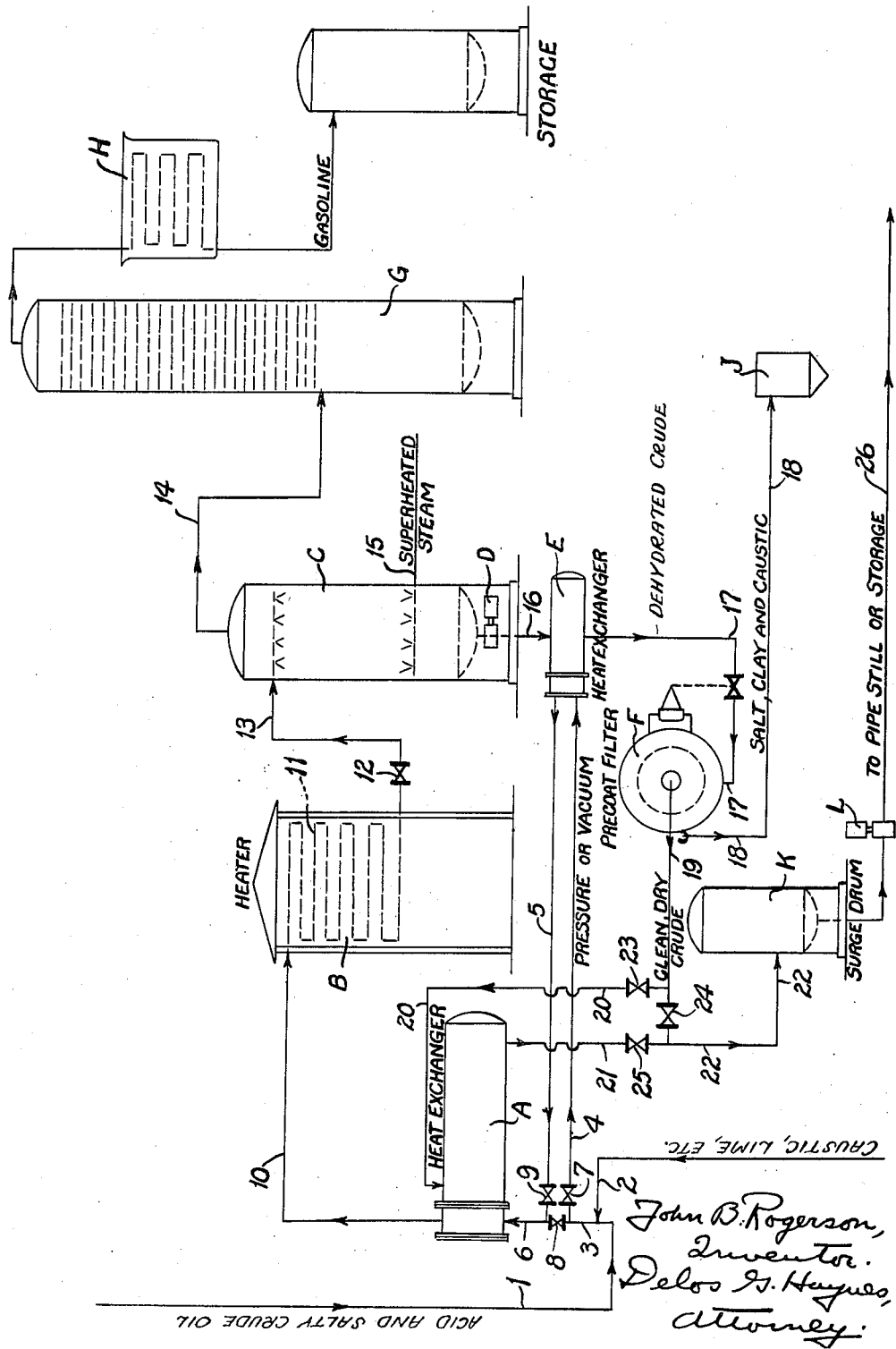

Patented Mar. 19, 1940

2,194,269

UNITED STATES PATENT OFFICE 2,194,269

OIL PURIFICATION PROCESS

John B. Rogerson, El Dorado, Ark.

Application March 21, 1938, Serial No. 197,223

1 Claim. (Cl. 196—4)

This invention relates to an oil purification process, and with regard to certain more specific features, to a process of rectifying crude petroleum oil or fractions thereof by removing salts, acids, and other impurities (or any of them) occurring either naturally or otherwise in the crude oil or crude oil fractions.

Among the several objects of the invention may be noted (1) the provision of a process whereby the salts are reformed to a more crystalline state so that they may be removed by filtration; (2) the provision of a process of the class described whereby certain constituents due to chemical reactions are reformed to salts and soaps (or either of them) so that the salts or soaps may be removed by filtration; and (3) the provision of a process of the class described whereby said salts or soaps (or both) are removed by filtration. Other objects will be in part obvious and in part pointed out hereinafter.

The invention accordingly comprises the steps and sequence of steps, and features of synthesis, which will be exemplified in the process hereinafter described, and the scope of the application of which will be indicated in the following claim.

In the accompanying drawing, in which is illustrated one of various possible embodiments of the invention, the single figure diagrammatically illustrates the process as carried out by physical apparatus.

Similar reference characters indicate corresponding parts throughout the drawing.

Many crude oils, as produced from wells, are salt-water impregnated, that is, they contain salts, either in the forms of water solutions, or emulsifications with the oil, or in the forms of suspended crystals, or in colloidal suspensions in the oil. In fact, in any given oil, any or all of the various forms enumerated may be found. In the refining process and under the heat of distillation these salts precipitate in the tubes and vessels of the distillation equipment, thus necessitating frequent and costly cleaning and replacement of distillation equipment parts. Furthermore, under certain conditions these salts disintegrate, forming reaction products which in turn severely corrode the equipment to cause further costly replacements. Many crude oils also contain hydrogen sulphide or other chemically reacting constituents which likewise are corrosive and otherwise objectionable.

The first object above enumerated is accomplished by heating the crude oil or fraction thereof under conditions suitable for removing the water content. The removal of water reforms the salts to a more crystalline state and they are thereby rendered more filterable. Certain low-boiling-temperature constituents, if present, will also be removed with the water. The residue fraction is then passed through a filter wherein the salts are separated from the oil.

The second object above enumerated is accomplished by treating the corrosive or otherwise objectionable oil with a suitable chemical such as lime, caustic soda, or other agent for neutralizing acid. The oil is then passed through a heating process, such as described under the procedure for carrying out the first object, and the water and low-boiling fractions, if present, are removed. The salts, soaps, and the like either originally in the crude oil or which are formed by chemical reaction with the neutralization agent are removed by filtration.

The third object of the invention is accomplished by passing the oil, which is now free of water (dehydrated), and free of low-boiling constituents, through a filter either of the vacuum or pressure type, wherein the filterable salts, soaps, or other objectionable materials, are removed, and from which an oil is obtained which is substantially clean and dry.

Referring now more particularly to the drawing, the crude oil to be rectified is introduced into the system through pipe 1. This oil may be acid or salty or both. If hydrogen sulphide or other objectionable chemically reacting constituents are to be removed, a suitable neutralizing agent, such as lime, caustic soda, or the like, is introduced into pipe 1 through pipe 2. The oil and the chemicals then intimately mix and pass through pipes 3 and 4 to a first heat exchanger E, thence through pipes 5 and 6 to a second heat exchanger A.

It is to be noted that a system of valves 7, 8 and 9 may be adjusted so that only a portion of the oil charge is passed through exchanger E, if desired, in order to control the temperature of the oil (which later passes to a filter press) so that it is best suited for filter press operation.

From the second heat exchanger A the oil, which has already absorbed considerable preheat from the exchangers E and A, passes through pipe 10 into the coils 11 located in the heater B. The heater B is here represented as being a pipe still of conventional type. Back pressure (which is super-atmospheric) is held on the heating assembly by means of a tail valve 12 to prevent excessive deposition of salt or chemicals in the heating equipment. The heated oil is then discharged through pipe 13 into vessel C which is on the reduced pressure side of the system.

Water and low-boiling-temperature constituents, if present in the oil, are vaporized in vessel C and discharged through pipe 14 into the fractionating equipment G and condensing equipment H. To assist vaporization in tower C, steam or its equivalent, preferably superheated, is injected through pipe 15 into vessel C.

The dehydrated oil is withdrawn from vessel C by means of pump D and passed through pipe 16 to the first heat exchanger E, where it is cooled to a suitable filtration temperature (as above indicated) and introduced through pipe 17 to the filter F. The filter shown is a suitable continuous, precoat vacuum or pressure filter which permits of a continuous flow of oil. Certain salts, chemicals, chemical reaction products from the oil, and a certain amount of filter material are discharged together through pipe 18 into sump J.

The rectified, clean and dry oil leaves the filter through pipe 19 and is transferred to the second heat exchanger A by means of pipe 20. From the exchanger A the oil passes through pipes 21 and 22 to the surge drum receiver K from which it is withdrawn by pump L and discharged through pipe 26 to the distillation equipment for further and ordinary refining or to storage. Valves 23, 24 and 25 may be adjusted so that a portion or all of the oil from the filter F may bypass the second heat exchanger A if so desired.

In view of the above, it will be seen that the several objects of the invention are achieved and other advantageous results attained.

As many changes could be made in carrying out the above processes without departing from the scope of the invention, it is intended that all matter contained in the above description or shown in the accompanying drawing shall be interpreted as illustrative and not in a limiting sense.

I claim:

The continuous process of treating salt-impregnated crude oil comprising heating said oil under super-atmospheric pressure adapted to prevent excessive deposition of salt in the necessary heating equipment, releasing said pressure to a lower one and heating the oil under the lower pressure to a degree adapted to effect vaporization of water and low-boiling-point constituents whereby the salt is placed in a more crystallized state, and filtering the unvaporized portions to remove the crystallized salt.

JOHN B. ROGERSON.